United States Patent [19]

Funk

[11] Patent Number: 5,749,283
[45] Date of Patent: May 12, 1998

[54] OVEN WITH SLIDE-OUT TRANSFER GUIDES

[75] Inventor: Garrett T. Funk, Fullerton, Calif.

[73] Assignee: Casa Herrera, Inc., Pomona, Calif.

[21] Appl. No.: 769,497

[22] Filed: Dec. 18, 1996

[51] Int. Cl.$^6$ .................. A23L 1/00; A47J 37/00; A21B 1/42

[52] U.S. Cl. .................. 99/339; 99/352; 99/355; 99/386; 99/423; 99/443 C; 99/477; 198/403; 198/560; 198/603; 414/152

[58] Field of Search .................. 99/339, 340, 352–355, 99/386, 423, 443 R, 443 C, 477–479, 483; 426/502, 439, 233, 523, 243, 496; 219/388; 198/402, 403, 560, 603, 609; 414/151, 152, 415; 126/41 C

[56] References Cited

U.S. PATENT DOCUMENTS

| | | | |
|---|---|---|---|
| 2,822,942 | 2/1958 | Lanham | 198/560 |
| 3,478,704 | 11/1969 | Ford | 414/152 X |
| 3,993,788 | 11/1976 | Longenecker | 426/502 |
| 4,154,152 | 5/1979 | Lang-Ree et al. | 99/386 |
| 4,309,938 | 1/1982 | Harmon | 99/477 |
| 4,508,025 | 4/1985 | Schultz | 99/423 |
| 4,530,632 | 7/1985 | Sela | 414/788.9 |
| 4,549,477 | 10/1985 | McCabe, Jr. | 99/477 |
| 4,571,341 | 2/1986 | Sugimura | 426/523 |
| 4,600,596 | 7/1986 | Gongwer et al. | 99/443 C |
| 4,711,164 | 12/1987 | Mendoza | 99/339 |
| 4,719,272 | 1/1988 | Mendonza | 99/339 |
| 4,978,548 | 12/1990 | Cope et al. | 99/352 X |
| 5,392,696 | 2/1995 | Navarro et al. | |

*Primary Examiner*—Timothy F. Simone
*Attorney, Agent, or Firm*—Joseph C. Andras

[57] ABSTRACT

An oven with slide-out transfer guides is provided for use in conjunction with multiple conveyors ovens to provide quick and convenient accessibility to an oven's interior in case of product transfer difficulties. A slidable rail assembly is mounted in the oven, which also has an access port for transfer guide egress and ingress, and a transfer guide with opposed lips forming a slot which mounts the transfer guide on the rail assembly. When access to the oven's interior is necessary to remedy a product transfer problem, the oven of the present invention allows the transfer guide to slide along the rail while still supported by same, and said transfer guide can be partially removed from said oven without the need to turn off the oven. In this way, obstructions can be cleared quickly without significant down time, thereby saving the user both time and expense.

3 Claims, 4 Drawing Sheets

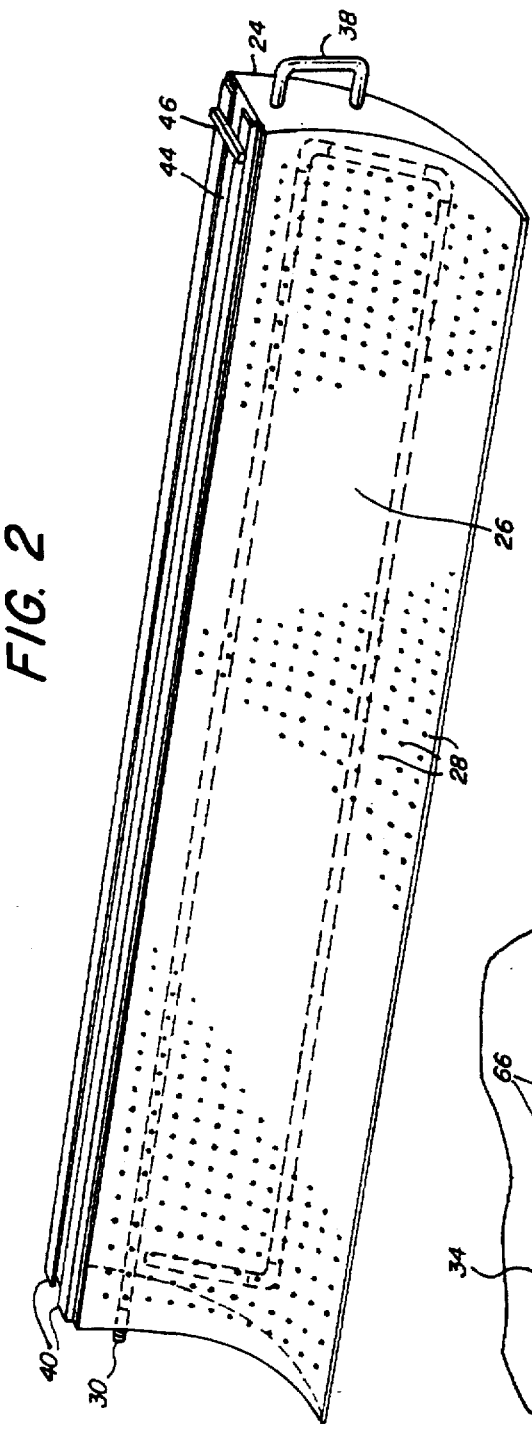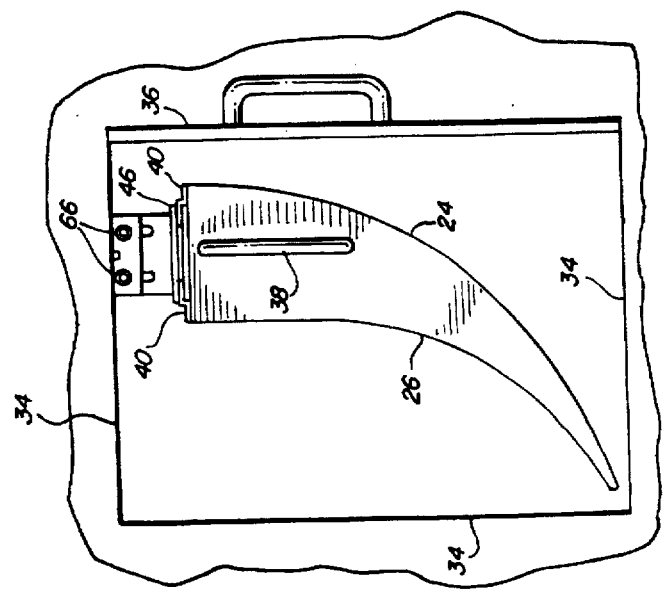

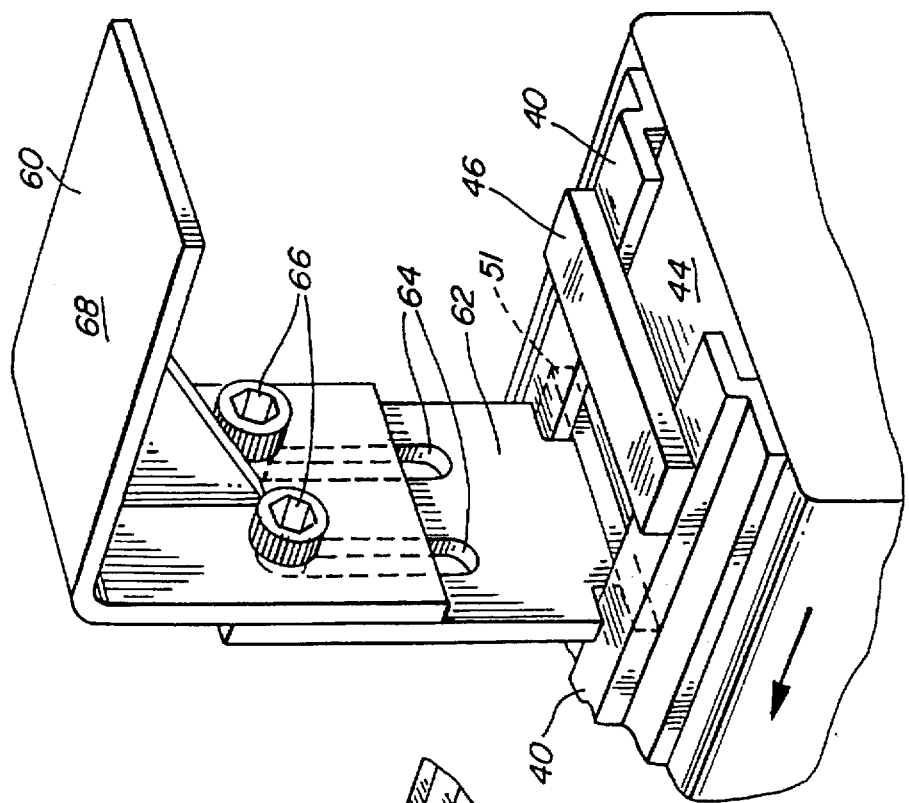
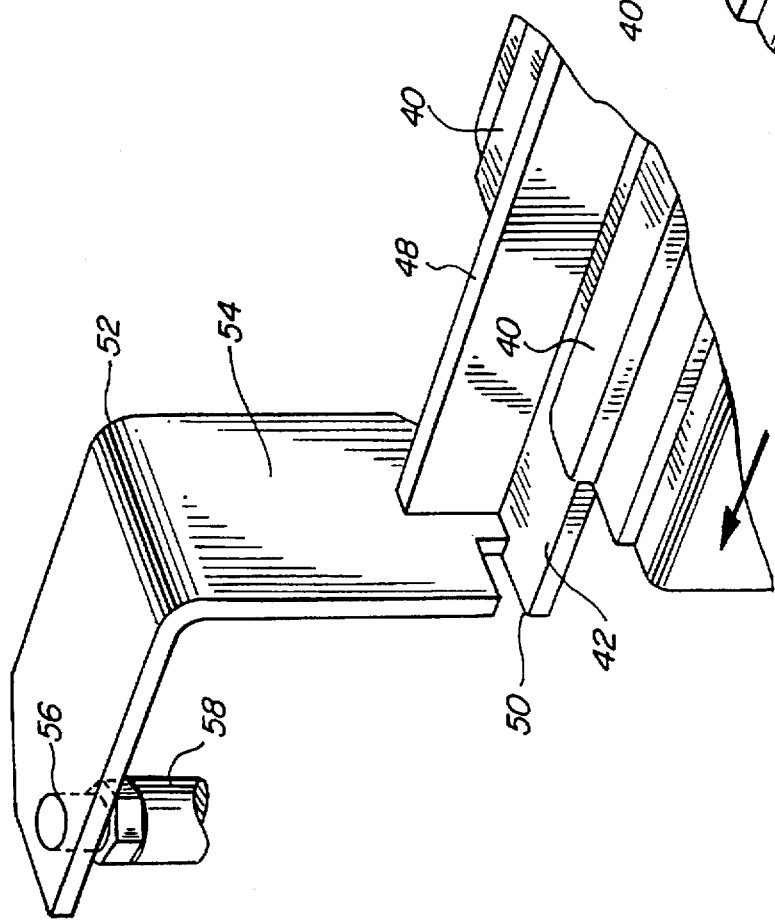

OVEN WITH SLIDE-OUT TRANSFER GUIDES

BACKGROUND OF THE INVENTION

1. Field of the Invention

The present invention relates generally to commercial ovens and, more particularly, to an oven with multiple conveyors for transporting items therein having slidably removable transfer guides to provide greater accessibility to the oven's interior in the event of product transfer problems.

2. Description of Related Art

Large commercial baking ovens used in the field of comestibles such as tortillas typically employ conveyers to communicate the items within the oven during the baking process. An oven of this variety can have many conveyors vertically spaced in parallel rows and the path defined by the motion of the conveyors follows a serpentine path from the uppermost conveyor to the bottom conveyor. In a large commercial baking oven, dough sheets enter the oven at the top and are deposited on the upper conveyor, which transports the dough sheets across the length of the oven while the sheets are being exposed to the environment of the oven's interior baking region. As the dough sheets reach the end of the upper conveyor, they are transferred to the next lower conveyor which transports the dough back across the oven in the other direction. This process is repeated until the dough sheets reach the bottom conveyor and are transported out of the oven after completing the baking process.

Each conveyor is comprised of an endless belt mounted on a series of rollers, with one roller typically driving the belt while the other rollers guide the belt and maintain its alignment. The tension in the belt must be maintained because the roller which drives the conveyor is usually a friction driven system; that is, the only force operating on the belt is the friction generated by the tension of the belt on the roller. Only a sufficiently tightly wound belt will have the necessary friction to maintain the drive roller contact without slipping. The belts are often times a wire mesh construction, which is flexible enough to be mounted and to turn on a roller but strong enough to withstand the temperatures and stresses generated in the belt in the operation of the conveyor. Adjacent belts are rotated in opposite directions such that the exit end of first belt will necessarily coincide with the beginning end of the next belt. Items completing the path across the belts must be transferred to an adjacent lower belt where it returns across oven, and so on. The belts are usually wide enough for and are designed to transport multiple rows of items and maintain the items in rows to preserve the necessary spacing often needed for baking applications.

The process by which the items are transferred in the oven from an upper conveyor to a lower conveyor can be accomplished by many means, but perhaps the most common and efficient method is by use of a transfer guide or chute placed at the end of the upper conveyor. This method, which is gravity driven to move items to the next lower level, is especially suited for nonfragile items due to the dropping or falling manner in which items are transferred. The transfer guide is mounted within the oven adjacent to the end of a conveyor, and adapted to receive items which reach the end of the conveyor and either fall off the edge or received by the guide just prior to the items falling. Transfer guides are well known in the art and typically have a curved surface for receiving the items coming off the conveyor and safely transferring the items to the next lower conveyor. The curvature of the guides both catch the items as they exit the first conveyor and slow the item's descent prior to their deposit on the next conveyor. These guides usually span the width of the oven and can transfer entire rows of items, and the items remain in rows when they are deposited on the next conveyor.

The transfer guides are designed to quickly transfer the items and, in some cases, the items are inverted to ensure uniform baking. For tortillas, the transfer guide is designed and positioned such that the flattened dough sheets reach the end of the first conveyor and fall onto the guide upside down, sliding along the transfer guide to the edge of the next conveyor where it is deposited thereon. The new conveyor receives the dough sheets with the uncooked side now exposed and transports them across the oven and so on, with each pass of the oven cooking an alternate side of the dough sheets.

One difficulty which arises with this procedure occurs when the transfer guide fails to successfully transfer the dough sheets, or other items, to the next conveyor. This can occur for a number of reasons such as an unusual consistency of the dough causing the item to stick to the guide, having a dough sheet become wedged between the conveyer and the transfer guide, or an odd-shaped sheet which becomes trapped. When one of these situations occur, the problem can lead to a piling up of the successive sheets, which can result in an impasse where no dough sheets can get through and the oven becomes clogged with dough sheets. This occurrence can result in a potentially dangerous situation as the tortillas can catch fire when exposed for too long in the oven. Furthermore, the situation requires that the oven be turned off and allowed to cool so that the path can be cleared safely. This results in extended down periods and the loss of operation as the oven cools and then reheats, which has led the art of oven construction to continuously addressed this situation.

To avoid this problem, transfer guides have used various methods to eliminate the bunching or clogging of the items in the oven as they are transferred from one conveyor to the next. The transfer guides are polished to a smooth surface to attempt to eliminate friction from causing the tortillas to stick to the transfer guides. Transfer guides also have been equipped with small air holes on the receiving surface and compressed air is supplied to the guide's interior cavity which generates a column of air on the surface. This blowing method is effective for keeping items such as tortillas from sticking to the surface of the transfer guide and for facilitating the transfer process, but is not completely effective and the problems relating to oven clogging described above continue to plague the industry. The present invention has taken a new approach to the problem.

The prior art is still seeking to eliminate the occurrence of the bunching or clogging of the oven between conveyors as the items are transferred from one level to another. The present invention seeks to reduce the inconvenience and delay when such an occurrence does happen. The oven of the present invention is provided with slidable transfer guides which may be removed from the oven through a specially designed access port, thereby allowing the transfer guide and any accompanying obstruction to be cleared quickly without the need to turn off the oven. Additionally, the transfer guides can be quickly cleaned if the surface becomes dirty or rough to prevent the clogging of the oven. Mounted on support brackets which permit it to slide into and out of the oven when needed, the transfer guide of the present invention provides quick and easy access to the internal oven compartment. Using this method, impasses can be cleared in a matter of seconds, often requiring only that the transfer guides be jostled or removed and replaced without the need to turn off the oven. At most, the conveyors may need to be stopped and restarted after clearing the path which can be completed in a matter of moments.

OBJECTS AND SUMMARY OF THE INVENTION

The present invention is directed to an improved oven equipped with conveyors, the improvement comprising a slide out transfer guide designed to permit quick access to the oven's baking compartment in order to clear obstructions in the oven's path. It is an object of the present invention to provide an oven having rapid access capability to an oven's internal baking compartment without requiring the oven to be turned off. It is another object of the present invention to provide a transfer guide for an oven which easily slides out of said oven. It is another object of the present invention to provide a mounting apparatus and access port for an oven that will accommodate a slide out transfer guide.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is an oblique view of the transfer guide of the present invention illustrating the handle position and mounting apparatus;

FIG. 3 is a profile view of the transfer guide of the present invention through the access port;

FIG. 5 is an enlarged view of the mounting configuration of the transfer guide's mounting bracket on the oven's distal end; and FIG. 6 is an enlarged view of the mounting configuration of the transfer guide's mounting bracket on the oven's proximal end.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to commercial ovens with slide out transfer guides.

Figure 1:
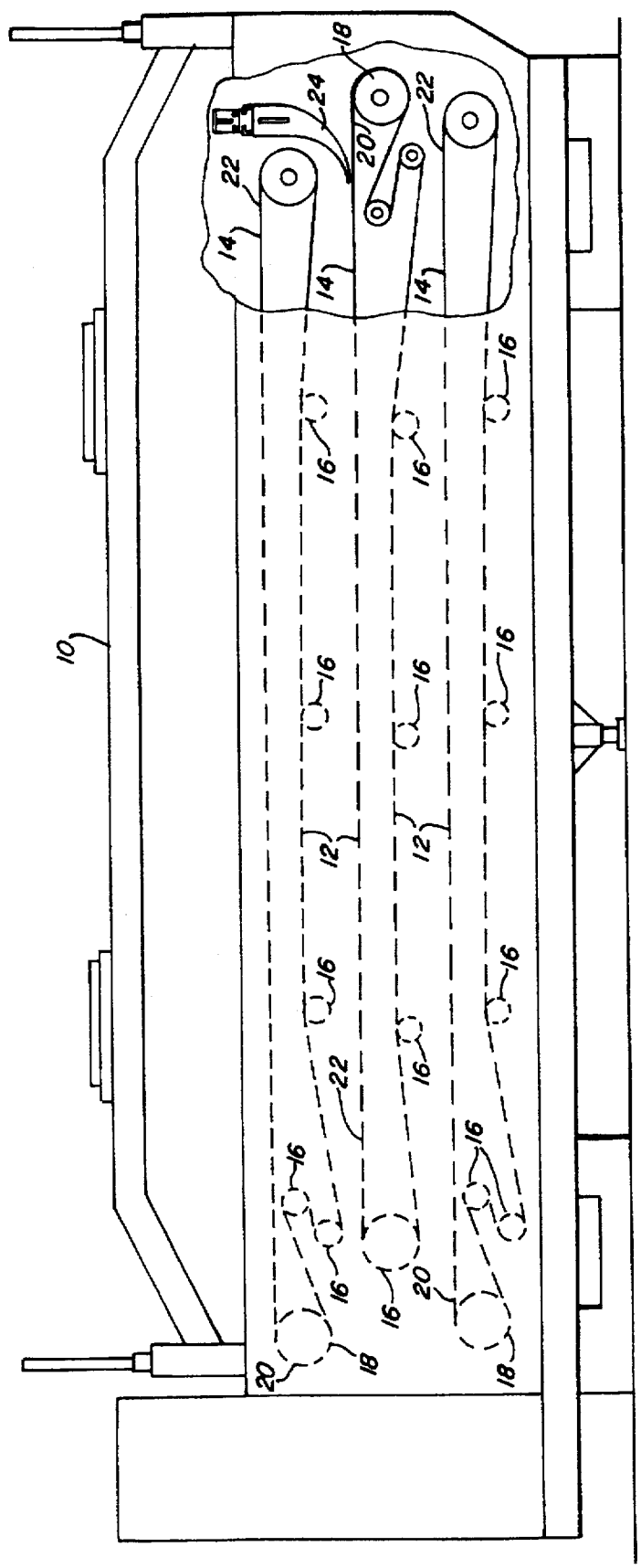
FIG. 1 is a side view of the oven of the present invention illustrating in the cut-away section a typical position of the slidable transfer guide of the present invention.

The present invention is directed to an oven having transfer guides which are adapted to slide into and out of the oven easily and quickly without requiring the oven to be turned off. Using an access port in the side of the oven to access the transfer guide, a user can remove impediments or clear obstructions which accumulate on the transfer guide during operation. The oven 10 of the present invention is shown generally at FIG. 1. Conveyors 12 rotate in the oven to communicate items such as tortillas (not shown) from the top conveyor to the next lower conveyor and so on until the items reach the bottom conveyor, where they exit the oven 10 to be collected or otherwise transported for further processing. The conveyors 12 are comprised of endless belts 14 typically of a wire mesh construction mounted on a series of rollers 16. One of the rollers 18 is driven by a motor (not shown), which in turn drives the belt 14 on its endless path within the oven 10. All or substantially all of the conveyor 12 lies within the oven's baking environment such that items on the conveyor 12 are baked as they follow the paths defined by the series of belts 14.

Each conveyor 12 has a receiving end 20 for receiving the items and a transfer end 22 where the items exit the conveyor to be transferred to another conveyor or to exit the oven. At the transfer end 22 of each conveyor 12 is a transfer guide 24, shown generally in FIG. 2. The transfer guide 24 generally has a curved front surface 26 for receiving the items as they exit the conveyor and which serves to both slow the item's descent and provide the item with some forward momentum to assist in the transfer to the next conveyor. Items exiting the transfer end 22 of the conveyor 12 have some forward momentum as they exit the belt 14 and fall onto the transfer guide 24. Furthermore, an item such as a tortilla will tend to rotate as it falls such that the surface initially face down on the first conveyor belt will face up on the second conveyor belt. In this manner, the tortilla cooks more evenly and consistently that methods which do not invert the item.

The transfer guide 24 is provided with a plurality of apertures 28 on the front surface 26 which extend to an interior cavity of the transfer guide. An air supply is connected to the transfer guide 24 at a valve 30 provided on the end of the transfer guide 24 during operation of the oven and is communicated within the transfer guide's internal cavity by means of an air pipe 32. The air pipe 32 has holes therein which fill the cavity with compressed air, which in turn escapes through the apertures 28 in order to produce a column of air over the surface of the guide 24. The column of air deters the accumulation of debris on the guide and resists sticking of the items to the guide 24 which may cause an obstruction.

The oven 10 of the present invention is equipped with access ports 34 on the side of the oven wall aligned with the transfer guides 24, shown generally in FIG. 3. The access ports 34 can be sliding doors or hinged doors 36, but should provide quick access to the oven's interior while maintaining thermal insulation when not in use. The access ports 34 are sized to permit a transfer guide 24 to slide through the opening easily and provide some room to reach into the oven's interior with an elongated tool and remove any clogging items. The transfer guide 24 of the present invention has a handle 38 for grasping on the end which is exposed to the outside of the oven when the access port 34 is open. Using the handle 38, a user can pull the transfer guide 24 out of the oven 10 while the transfer guide 24 remains suspended by its support means, discussed below. The operation of the transfer guide is independent of the conveyors 12 or the operation of the rest of the oven such that the transfer guides 24 can be slidably removed while the oven is in operation. This feature allows any obstruction to be cleared without significant interference with the operation of the oven. For example, if an obstruction occurs which requires that the interior of the oven be accessed, it is only required that the introduction of additional items to the conveyor be temporarily halted and the access port 34 be opened. The transfer guide 24 can be grasped by the handle 38 and slid from the oven's interior to preferably clear the passage of the conveyor 12. If the passage is not cleared by removing the transfer guide 24, a tool can be used to break up any congestion and clear the passage. The transfer guide 24 can be quickly slid back into position and the assembly line restarted with minimum interruption.

The transfer guide 24 is mounted in the oven 10 in such a way as to provide a sturdy support for the guide in its operational position while permitting the guide to slide back and forth through the access port when necessary. To accomplish this, the transfer guide 24 includes opposed brackets 40 on the upper surface which are designed to fit on a beam 42 aligned with the access port 34. The brackets 40, as shown in FIG. 2, typically span the length of the transfer guide 24 and form a slot 44 therebetween and which can support the weight of the transfer guide 24. At the proximal end of the slot 44 is a stop bar 46 which serves to stop the guide from sliding to far into the oven. The stop bar 46 is usually welded across the brackets 44 to provide a permanent stop, although less permanent means of fixing the bar on the brackets can be used.

Figure 4:
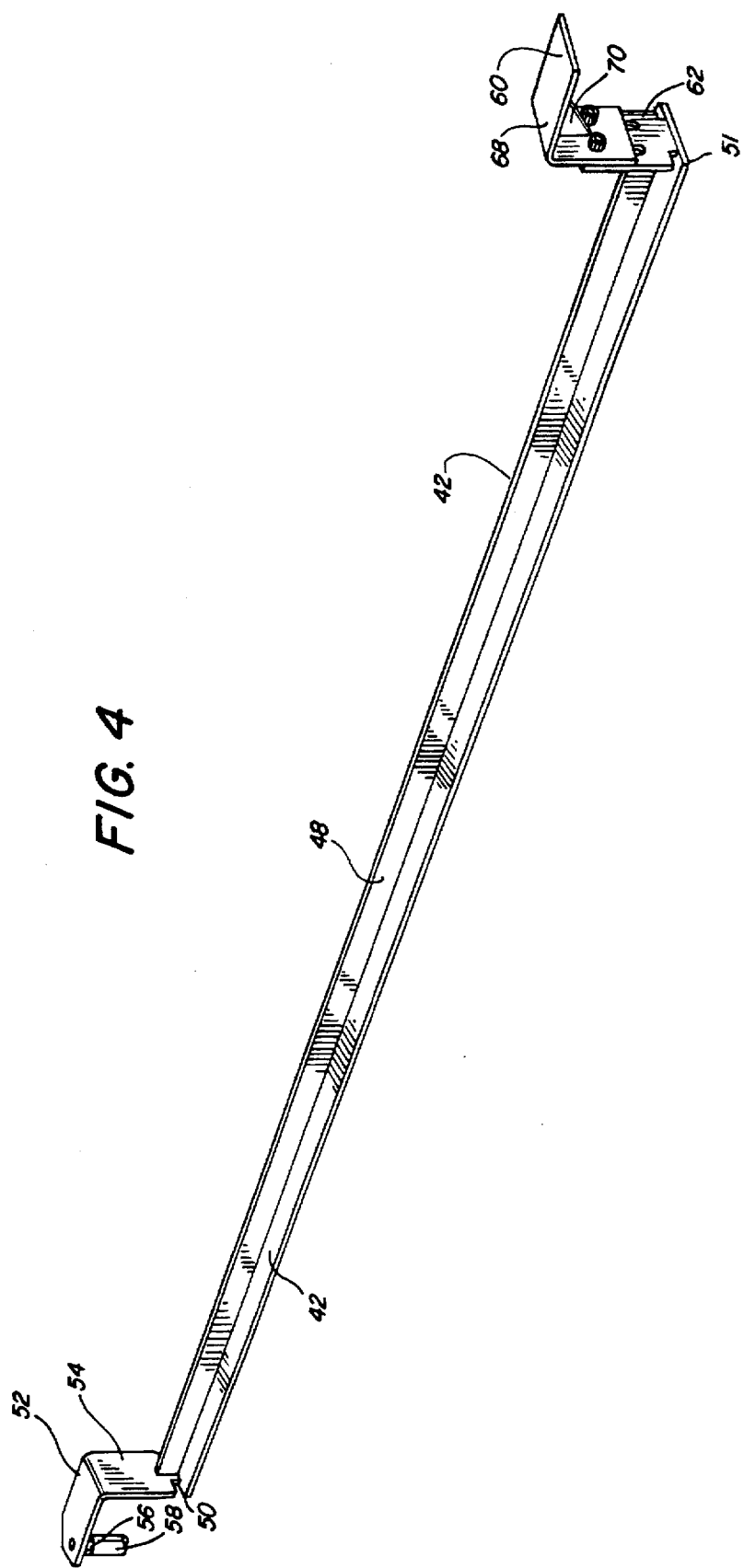
FIG. 4 is an oblique view of the oven's supporting beam from which the transfer guide is slidably mounted.

The oven has a mounting assembly as shown in FIG. 4 spanning the width of the oven to support the transfer guide 24 in the oven 10 and to permit the sliding action into and out of the oven. The transfer guide 24 is suspended from a beam 42 which spans the oven and is aligned with the access port 34 to permit the transfer guide 24 to slide along the beam 42 through the access port 34. The beam 42 has a main segment with a profile of an inverted T, which allows the brackets 40 of the transfer guide to mount onto the beam 42 and slide along the beam while it is supported in the vertical direction. The vertical component of the inverted T is a web 48 which is used to strengthen the beam 42 and resist bending of the beam without impeding the sliding path of the transfer guide 24. At the distal end of the beam 50 is an L-shaped plate 52 having a first surface 54 orientated perpendicular to both the plane of the web 48 and the upper surface of the transfer guide. The L-shaped plate 52 is used to mount the beam 42 to the oven wall and is secured to the oven wall via the pin shown in shadow in FIG. 5. The juncture of the beam 42 with the L-shaped plate 52 is typically welded to create a permanent joint. The pin 56 is also welded to the L-shaped plate 52 and mates with the mating slot 58 which is secured to the oven wall, thereby fixing the beam 42.

At the proximal end of the beam 51, as shown in FIG. 6, another L-shaped plate 60 is used to secure the beam 42 to the opposing oven wall. The beam 42 is connected to a first support plate 62 orientated perpendicular to the beam and having elongated vertical slots 64 therein. The slots 64 are used to position the transfer guide 24 in the oven by cooperating with two fasteners 66 which secure the support plate 62 to the second L-shaped plate 60. The upper surface of the second L-shaped plate 68 is secured to the oven wall using either fasteners or a welded joint (not shown). Both L-shaped plates 52,60 are provided with traverse webs 70 to strengthen the plate and resist bending.

The following assembly provides the transfer guide with a rigid, sturdy, but removable support station which allows the transfer guide to easily slide along the beam in a longitudinal direction while remaining fixed in all other directions. With the access port open, the handle can be used to pull the transfer guide out of the oven. When the obstruction is cleared, the transfer guide can be reinserted into the oven using the handle until the stop bar prevents the transfer guide from sliding too far and damaging the oven wall.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved oven having a plurality of generally horizontal conveyers spaced vertically and rotating alternately in opposite directions to define a serpentine path from an entrance at a first end of an uppermost conveyor to an exit at a lowermost conveyor, said conveyors comprised of endless belts mounted on rollers disposed between opposed first and second walls, at least one of said rollers driving said belt, said conveyors used to transport items along said serpentine path from said entrance to said exit, said improvement comprising:

a transfer guide spaced from a conveyor and having a curved receiving surface for receiving items exiting a first conveyor and for transferring said items to an adjacent lower conveyor, said transfer guide further comprising mounting bracket means for mounting said transfer guide in said oven;

support beam means mounted within said oven and cooperating with said mounting bracket means to slidably support said transfer guide while permitting said transfer guide to slide horizontally into and out of said oven; and a transfer guide access port on said first wall sized to receive said transfer guide therethrough and aligned with said transfer guide, said access port further comprising a closing means for closing said access port.

2. An improved oven having a plurality of continuously moving conveyors defining a path for transporting objects therein, said conveyers spaced vertically and communicating objects from a first conveyer to a next lower conveyer using a gravity assisted transfer guide with a curved surface positioned for receiving said object, said transfer guide depositing said object on said next lower conveyer, said improvement comprising;

first and second mounting brackets fixed on said transfer guide at an upper surface and extending longitudinally along said transfer guide, said first mounting bracket and said second mounting bracket comprising opposed lips spaced from and generally parallel to said upper surface and cooperating to define a slot therebetween;

vertical support means for vertically supporting said transfer guide in said oven comprising a beam adapted to mate with said slot of said transfer guide and support said transfer guide thereon in a horizontal slidable relationship, said beam mounted in said oven and extending generally a width of said oven parallel to said transfer guide to define a sliding track, and beam mounting means for mounting said beam in said oven; and an oven access port positioned adjacent to said transfer guide and adapted to receive said transfer guide therethrough.

3. A slidably transfer guide and support assembly for an oven having a plurality of generally horizontal conveyers spaced vertically and rotating alternatingly in opposite directions to define a serpentine path from an entrance at a first end of an uppermost conveyor to an exit at a lowermost conveyor, said conveyors comprised of endless belts mounted on rollers disposed between opposed first and second walls, at least one of said rollers driving said belt, said conveyors used to transport items along said serpentine path from said entrance to said exit, said slidably transfer guide and support assembly comprising:

- a transfer guide spaced from a first conveyor and having a curved front surface adapted to receive said items exiting said first conveyor and communicate said item to a second conveyor spaced vertically from said first conveyor;
- a handle mounted on said transfer guide at a first side surface;
- first and second mounting brackets fixed on said transfer guide at an upper surface and extending longitudinally along said transfer guide, said first mounting bracket and said second mounting bracket comprising opposed lips spaced from and generally parallel to said upper surface and cooperating to define a slot therebetween;
- transfer guide slide inhibiting means fixed on said slot at a first end for positioning said slide within said oven;
- transfer guide rail means for supporting said transfer guide and defining a slidable linear track into and out of said oven for said transfer guide, said transfer guide rail means comprising a suspending beam member adapted to slidably mount said transfer guide thereon at said slot, and bracket support means for mounting said transfer guide rail means within said oven; and
- an oven access port positioned adjacent to said transfer guide and adapted to receive said transfer guide therethrough.

* * * * *